United States Patent
Du et al.

(10) Patent No.: US 11,777,965 B2
(45) Date of Patent: Oct. 3, 2023

(54) PATTERN MATCH-BASED DETECTION IN IOT SECURITY

(71) Applicant: Palo Alto Networks, Inc., Santa Clara, CA (US)

(72) Inventors: Jun Du, Cupertino, CA (US); Mei Wang, Saratoga, CA (US); Hector Daniel Regalado, Milpitas, CA (US); Jianhong Xia, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 350 days.

(21) Appl. No.: 16/445,203

(22) Filed: Jun. 18, 2019

(65) Prior Publication Data

US 2019/0387011 A1    Dec. 19, 2019

Related U.S. Application Data

(60) Provisional application No. 62/686,544, filed on Jun. 18, 2018.

(51) Int. Cl.
 *H04L 9/40* (2022.01)
 *G06N 20/00* (2019.01)

(52) U.S. Cl.
 CPC ......... *H04L 63/1425* (2013.01); *G06N 20/00* (2019.01); *H04L 63/20* (2013.01)

(58) Field of Classification Search
 CPC ..... H04L 63/1425; H04L 63/20; H04L 67/12; G06N 20/00
 See application file for complete search history.

(56) References Cited

U.S. PATENT DOCUMENTS

| | | |
|---|---|---|
| 6,142,682 A | 11/2000 | Skogby |
| 6,877,146 B1 | 4/2005 | Teig |
| 8,146,133 B2 | 3/2012 | Moon |
| 8,159,966 B1 | 4/2012 | Mabee |
| 8,331,229 B1 | 12/2012 | Hu |
| 8,671,099 B2 | 3/2014 | Kapoor |
| 8,683,598 B1 | 3/2014 | Cashin |
| 8,850,588 B2 | 9/2014 | Kumar |
| 8,874,550 B1 | 10/2014 | Soubramanien |
| 8,891,528 B2 | 11/2014 | Moriarty |
| 8,898,788 B1 | 11/2014 | Aziz |

(Continued)

FOREIGN PATENT DOCUMENTS

| | | |
|---|---|---|
| CN | 102025577 | 7/2012 |
| CN | 107862468 | 3/2018 |

(Continued)

OTHER PUBLICATIONS

Blackstock et al., IoT Interoperability: A Hub-based Approach, 2014, IEEE International Conference on the Internet of Things (IOT), pp. 80-84.

(Continued)

*Primary Examiner* — Beemnet W Dada
(74) *Attorney, Agent, or Firm* — Van Pelt, Yi & James LLP

(57) ABSTRACT

Techniques for providing Internet of Things (IoT) security are disclosed. An applicable system includes profiling IoT devices to limit the number of network signatures applicable to the IoT devices and performing pattern matching using a pattern that is appropriate for the profile of a given IoT device.

40 Claims, 7 Drawing Sheets

(56) References Cited

U.S. PATENT DOCUMENTS

| | | |
|---|---|---|
| 8,973,088 B1 | 3/2015 | Leung |
| 9,324,119 B2 | 4/2016 | Singh |
| 9,516,053 B1 | 12/2016 | Muddu |
| 9,548,987 B1 | 1/2017 | Poole |
| 9,584,536 B2 | 2/2017 | Nantel |
| 9,600,571 B2 | 3/2017 | Shaashua |
| 9,609,003 B1 | 3/2017 | Chmielewski |
| 9,661,011 B1 | 5/2017 | Van Horenbeeck |
| 9,692,784 B1 | 6/2017 | Nenov |
| 9,774,604 B2 | 9/2017 | Zou |
| 9,807,110 B2 | 10/2017 | Harlacher |
| 9,891,907 B2 | 2/2018 | Searle |
| 9,961,096 B1 | 5/2018 | Pierce |
| 9,984,344 B2 | 5/2018 | Singh |
| 10,038,700 B1 | 7/2018 | Duchin |
| 10,043,591 B1 | 8/2018 | Laborde |
| 10,122,747 B2 | 11/2018 | Mahaffey |
| 10,191,794 B2 | 1/2019 | Smith |
| 10,204,312 B2 | 2/2019 | Singh |
| 10,212,176 B2 | 2/2019 | Wang |
| 10,212,178 B2 | 2/2019 | Cheng |
| 10,229,269 B1 | 3/2019 | Patton |
| 10,237,875 B1 | 3/2019 | Romanov |
| 10,320,613 B1 | 6/2019 | Cam-Winget |
| 10,348,739 B2 | 7/2019 | Greenspan |
| 10,459,827 B1* | 10/2019 | Aghdaie ............... G06N 20/00 |
| 10,489,361 B2 | 11/2019 | Sisk |
| 10,511,620 B2 | 12/2019 | Schwartz |
| 10,623,389 B2 | 4/2020 | Childress |
| 10,630,728 B2 | 4/2020 | Ghosh |
| 10,764,315 B1 | 9/2020 | Carroll |
| 10,885,393 B1* | 1/2021 | Sirianni ............... G06F 16/278 |
| 10,887,306 B2 | 1/2021 | Gupta |
| 11,005,839 B1 | 5/2021 | Shahidzadeh |
| 11,070,568 B2 | 7/2021 | Ektare |
| 11,115,799 B1 | 9/2021 | Du |
| 11,310,247 B2 | 4/2022 | Manadhata |
| 11,455,641 B1 | 9/2022 | Shahidzadeh |
| 2004/0243835 A1 | 12/2004 | Terzis |
| 2006/0265397 A1 | 11/2006 | Bryan |
| 2008/0059536 A1 | 3/2008 | Brock |
| 2010/0284282 A1 | 11/2010 | Golic |
| 2011/0022812 A1 | 1/2011 | Van Der Linden |
| 2012/0065749 A1 | 3/2012 | Hunter |
| 2012/0102543 A1 | 4/2012 | Kohli |
| 2012/0240185 A1 | 9/2012 | Kapoor |
| 2013/0086261 A1 | 4/2013 | Lim |
| 2013/0173621 A1 | 7/2013 | Kapoor |
| 2013/0247190 A1* | 9/2013 | Spurlock ............. H04L 63/1425 |
| | | 726/23 |
| 2013/0305357 A1 | 11/2013 | Ayyagari |
| 2014/0006479 A1 | 1/2014 | Maloo |
| 2014/0244834 A1 | 8/2014 | Guedalia |
| 2014/0281912 A1 | 9/2014 | Doi |
| 2014/0325670 A1 | 10/2014 | Singh |
| 2014/0337862 A1 | 11/2014 | Valencia |
| 2015/0039513 A1 | 2/2015 | Adjaoute |
| 2015/0055623 A1 | 2/2015 | Li |
| 2015/0161024 A1 | 6/2015 | Gupta |
| 2015/0229654 A1 | 8/2015 | Perier |
| 2015/0262067 A1 | 9/2015 | Sridhara |
| 2015/0271192 A1 | 9/2015 | Crowley |
| 2015/0293954 A1 | 10/2015 | Hsiao |
| 2015/0295945 A1 | 10/2015 | Canzanese, Jr. |
| 2015/0324559 A1 | 11/2015 | Boss |
| 2015/0356451 A1 | 12/2015 | Gupta |
| 2016/0028750 A1 | 1/2016 | Di Pietro |
| 2016/0036819 A1 | 2/2016 | Zehavi |
| 2016/0048984 A1 | 2/2016 | Frigo |
| 2016/0119372 A1 | 4/2016 | Borlick |
| 2016/0128043 A1 | 5/2016 | Shuman |
| 2016/0173446 A1 | 6/2016 | Nantel |
| 2016/0173495 A1 | 6/2016 | Joo |
| 2016/0182497 A1 | 6/2016 | Smith |
| 2016/0196558 A1 | 7/2016 | Mercille |
| 2016/0212099 A1 | 7/2016 | Zou |
| 2016/0218949 A1 | 7/2016 | Dasgupta |
| 2016/0261465 A1 | 9/2016 | Gupta |
| 2016/0267406 A1 | 9/2016 | Bodo |
| 2016/0267408 A1* | 9/2016 | Singh ................... G06N 7/005 |
| 2016/0277435 A1 | 9/2016 | Salajegheh |
| 2016/0301707 A1 | 10/2016 | Cheng |
| 2016/0301717 A1 | 10/2016 | Dotan |
| 2016/0337127 A1 | 11/2016 | Schultz |
| 2016/0352685 A1 | 12/2016 | Park |
| 2016/0366141 A1 | 12/2016 | Smith |
| 2016/0366181 A1 | 12/2016 | Smith |
| 2017/0006028 A1 | 1/2017 | Tunnell |
| 2017/0006135 A1 | 1/2017 | Siebel |
| 2017/0011406 A1 | 1/2017 | Tunnell |
| 2017/0013005 A1 | 1/2017 | Galula |
| 2017/0055913 A1 | 3/2017 | Bandyopadhyay |
| 2017/0063774 A1 | 3/2017 | Chen |
| 2017/0093915 A1 | 3/2017 | Ellis |
| 2017/0118237 A1 | 4/2017 | Devi Reddy |
| 2017/0118240 A1 | 4/2017 | Devi Reddy |
| 2017/0124660 A1 | 5/2017 | Srivastava |
| 2017/0126704 A1 | 5/2017 | Nandha Premnath |
| 2017/0149813 A1 | 5/2017 | Wright |
| 2017/0180380 A1 | 6/2017 | Bagasra |
| 2017/0180399 A1 | 6/2017 | Sukhomlinov |
| 2017/0188242 A1 | 6/2017 | Ghosh |
| 2017/0200061 A1 | 7/2017 | Julian |
| 2017/0230402 A1 | 8/2017 | Greenspan |
| 2017/0232300 A1 | 8/2017 | Tran |
| 2017/0235585 A1 | 8/2017 | Gupta |
| 2017/0235783 A1 | 8/2017 | Chen |
| 2017/0244737 A1 | 8/2017 | Kuperman |
| 2017/0251007 A1 | 8/2017 | Fujisawa |
| 2017/0272554 A1 | 9/2017 | Kwan |
| 2017/0279685 A1 | 9/2017 | Mota |
| 2017/0289184 A1 | 10/2017 | C |
| 2017/0331671 A1 | 11/2017 | Olsson |
| 2017/0331906 A1 | 11/2017 | Choi |
| 2017/0339178 A1 | 11/2017 | Mahaffey |
| 2017/0344407 A1 | 11/2017 | Jeon |
| 2017/0346677 A1 | 11/2017 | Suryanarayana |
| 2018/0007058 A1 | 1/2018 | Zou |
| 2018/0012227 A1 | 1/2018 | Tunnell |
| 2018/0018684 A1 | 1/2018 | Orr |
| 2018/0027006 A1 | 1/2018 | Zimmermann |
| 2018/0078843 A1 | 3/2018 | Tran |
| 2018/0115574 A1 | 4/2018 | Ridley |
| 2018/0117446 A1 | 5/2018 | Tran |
| 2018/0117447 A1 | 5/2018 | Tran |
| 2018/0139227 A1 | 5/2018 | Martin |
| 2018/0144139 A1 | 5/2018 | Cheng |
| 2018/0191729 A1 | 7/2018 | Whittle |
| 2018/0191746 A1 | 7/2018 | De Knijf |
| 2018/0191848 A1 | 7/2018 | Bhattacharya |
| 2018/0205793 A1 | 7/2018 | Loeb |
| 2018/0212768 A1 | 7/2018 | Kawashima |
| 2018/0234302 A1 | 8/2018 | James |
| 2018/0234519 A1 | 8/2018 | Boyapalle |
| 2018/0248902 A1 | 8/2018 | Dănilă-Dumitrescu |
| 2018/0255084 A1 | 9/2018 | Kotinas |
| 2018/0261070 A1 | 9/2018 | Stevens |
| 2018/0264347 A1 | 9/2018 | Tran |
| 2018/0285234 A1 | 10/2018 | Degaonkar |
| 2018/0293387 A1 | 10/2018 | Bar-El |
| 2018/0295148 A1 | 10/2018 | Mayorgo |
| 2018/0302440 A1 | 10/2018 | Hu |
| 2018/0349598 A1 | 12/2018 | Harel |
| 2018/0349612 A1 | 12/2018 | Harel |
| 2018/0357556 A1 | 12/2018 | Rai |
| 2018/0375887 A1 | 12/2018 | Dezent |
| 2019/0019249 A1 | 1/2019 | Bhattacharjee |
| 2019/0081961 A1 | 3/2019 | Bansal |
| 2019/0089747 A1 | 3/2019 | Wang |
| 2019/0098028 A1 | 3/2019 | Ektare |
| 2019/0098058 A1 | 3/2019 | Ikegami |
| 2019/0109717 A1 | 4/2019 | Reddy |
| 2019/0121978 A1 | 4/2019 | Kraemer |
| 2019/0138512 A1 | 5/2019 | Pourmohammad |

(56) References Cited

U.S. PATENT DOCUMENTS

| | | |
|---|---|---|
| 2019/0182278 A1 | 6/2019 | Das |
| 2019/0268305 A1 | 8/2019 | Xu |
| 2019/0349426 A1 | 11/2019 | Smith |
| 2019/0361917 A1 | 11/2019 | Tran |
| 2019/0373472 A1 | 12/2019 | Smith |
| 2019/0387399 A1 | 12/2019 | Weinberg |
| 2020/0036603 A1 | 1/2020 | Nieves |
| 2020/0076846 A1 | 3/2020 | Pandian |
| 2020/0076853 A1 | 3/2020 | Pandian |
| 2020/0117690 A1 | 4/2020 | Tran |
| 2020/0156654 A1 | 5/2020 | Boss |
| 2020/0162278 A1 | 5/2020 | Delaney |
| 2020/0177485 A1 | 6/2020 | Shurtleff |
| 2020/0177589 A1 | 6/2020 | Mangalvedkar |
| 2020/0213146 A1 | 7/2020 | Kodam |
| 2020/0409957 A1 | 12/2020 | Zhang |

FOREIGN PATENT DOCUMENTS

| | | |
|---|---|---|
| CN | 108650133 | 10/2018 |
| CN | 107135093 | 5/2020 |
| CN | 108306911 | 12/2020 |
| EP | 3136297 | 3/2017 |
| JP | 2018513467 | 5/2018 |
| WO | 2019218874 | 11/2019 |

OTHER PUBLICATIONS

Miloslavskaya et al., Ensuring Information Security for Internet of Things, 2017, IEEE 5th International Conference of Future Internet of Things and Cloud, pp. 62-69.

Li et al., A Distributed Consensus Algorithm for Decision Making in Service-Oriented Internet of Things, Old Dominion University, ODU Digital Commons, 2014.

Nguyen et al., A Software-Defined Model for IoT Clusters: Enabling Applications on Demand, Faculty of Engineering and IT, University of Technology Sydney, Australia, IEEE Xplore, Apr. 23, 2018.

Fredj et al., A Scalable IoT Service Search Based on Clustering and Aggregation, 2013 IEEE International Conference on Green Computing and Communication and IEEE Internet of Things and IEEE Cyber, Physical and Social Computing, pp. 1-8.

International Application No. PCT/US2016/025661, International Search Report and Written Opinion dated Jul. 7, 2016.

Liu et al., A Lightweight Anomaly Mining Algorithm in the Internet of Things, 2014 IEEE 5th International Conference on Software Engineering and Service Science, 2014, pp. 1142-1145.

Sivanathan et al., Classifying IoT Devices in Smart Environments Using Network Traffic Characteristics, IEEE, TMC, No. 8, pp. 1745-1759, Aug. 2018.

Sivanathan et al., Detecting Behavioral Change of IoT Devices Using Clustering-Based Network Traffic Modeling, IEEE LCN 2019, Mar. 30, 2020.

Sivanathan et al., Inferring IoT Device Types from Network Behavior Using Unsupervised Clustering, IEEE ICN 2019, Oct. 2019.

Charyyev et al., Locality-Sensitive IoT Network Traffic Fingerprinting for Device Identification, IEEE Internet of Things Journal, 2020, vol. 8, No. 3, pp. 1272-1281.

Du et al., A Lightweight Flow Feature-Based IoT Device Identification Scheme, Security and Communication Networks, 2022.

Zhao et al., A Few-Shot Learning Based Approach to IoT Traffic Classification, IEEE Communications Letters, 2021.

Author Unknown, Cisco Encrypted Traffic Analytics, Feb. 10, 2021.

Al-Shaer et al., Design and Implementation of Firewall Policy Advisor Tools, 2002.

Al-Shaer et al., Firewall Policy Advisor for Anomaly Discovery and Rule Editing, Integrated Network Management VIII, 2003.

Martin et al., Requirements and Recommendations for CWE Compatibility and CWE Effectiveness, Version 1.0, Jul. 28, 2011.

National Electrical Manufacturers Association, Manufacturer Disclosure Statement for Medical Device Security, HIMSS/NEMA Standard HN Jan. 2013, 2013.

Charu C. Aggarwal, Outlier Analysis, Retrieved from the Internet, URL: https://web.archive.org/web/20130210212057/http://charuaggarwal.net/outlierbook.pdf.

Hirofumi Nakakoji, et al., "Study of the Incident Tendency Detection Method on Frequency Analysis," Technical Report of IEICE, Japan, The Institute of Electronics, Information and Communication Engineers (IEICE), Jul. 14, 2005, vol. 105, No. 193, pp. 83-88.

Arash Fasihi , Rule Based Inference and Action Selection Based on Monitoring Data in IoT, Dec. 1, 2015.

Cramer et al., Detecting Anomalies in Device Event Data in the IoT, Proceedings of the 3td International Conference on Internet of Things, Big Data and Security, Mar. 21, 2018, pp. 52-62.

Midi et al., Kalis—A System for Knowledge-driven Adaptable Intrusion Detection for the Internet of Things, 2017 IEEE 37th International Conference on Distributed Computing Systems, pp. 656-666.

Chen et al., A Model-Based Validated Autonomic Approach to Self-Protect Computing Systems, IEEE Internet of Things Journal, Oct. 2014, pp. 446-460, vol. 1, No. 5.

International Application No. PCT/US2019/037823, Search Report and Written Opinion dated Nov. 14, 2019.

* cited by examiner

PATTERN MATCH-BASED DETECTION IN IOT SECURITY

CROSS-REFERENCE TO RELATED APPLICATIONS

The present application claims priority to U.S. Provisional Patent Application Ser. No. 62/686,544 filed Jun. 18, 2018, which is hereby incorporated by reference herein.

DETAILED DESCRIPTION

Figure 1:
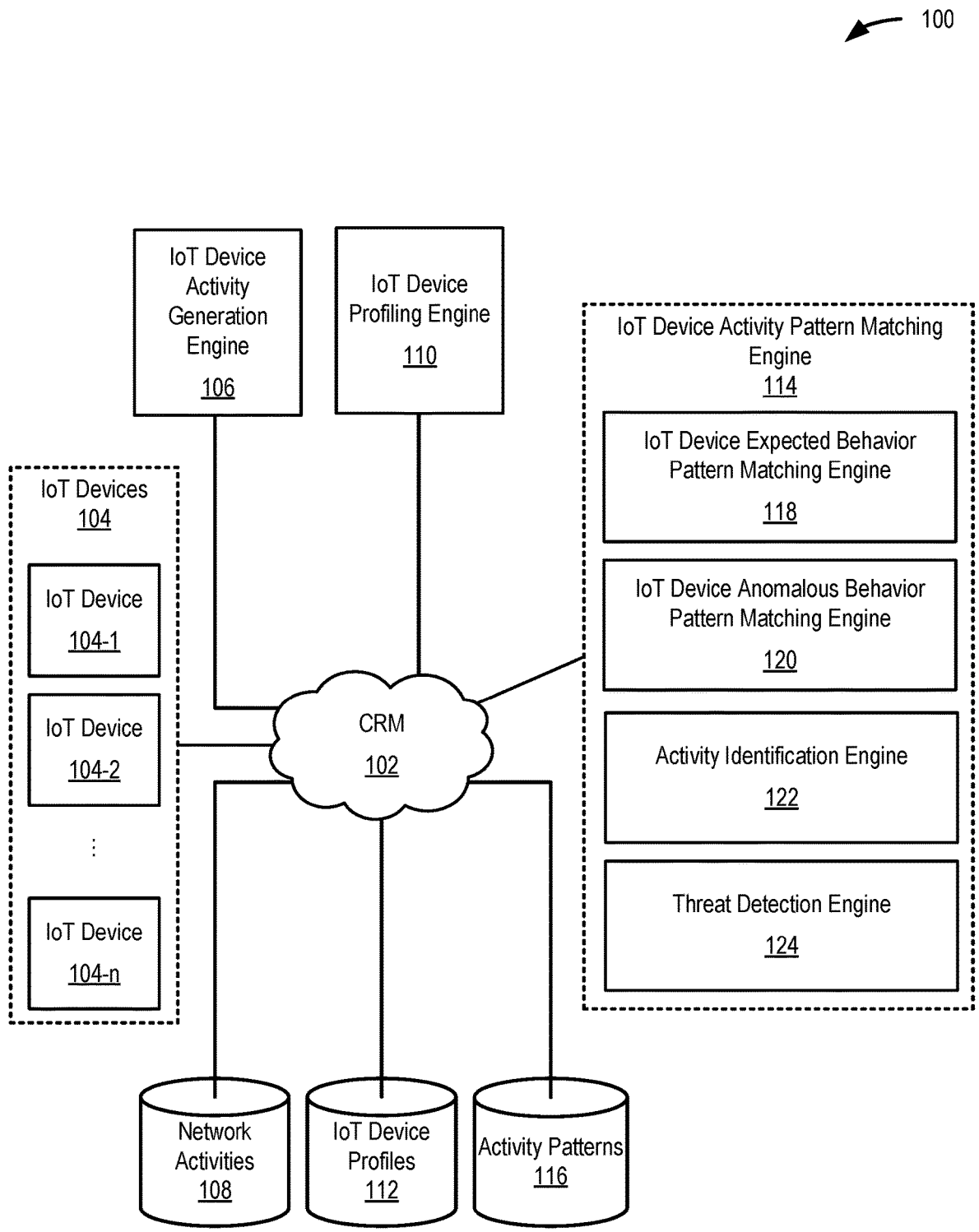
FIG. 1 depicts a diagram of an example of a system for pattern match-based detection in Internet of Things (IoT) security.

FIG. 1 depicts a diagram 100 of an example of a system for pattern match-based detection in Internet of Things (IoT) security. The diagram 100 includes a computer-readable medium (CRM) 102, IoT device 104-1 . . . 104-n (collectively, "IoT devices 104") coupled to the CRM 102, an IoT device activity generation engine 106 coupled to the CRM 102, a network activities datastore 108 coupled to the CRM 102, an IoT device profiling engine 110 coupled to the CRM 102, an IoT device profiles datastore 112 coupled to the CRM 102, an IoT device activity pattern matching engine 114 coupled to the CRM 102, and an activity patterns datastore 116 coupled to the CRM 102.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Where a first component is located on one device and a second component is located on a different device, the CRM 102 can include a wireless or wired back-end network or LAN. The CRM 102 can also encompass a relevant portion of a WAN or other network, if applicable.

The computer readable mediums discussed in this paper are intended to include all mediums that are statutory (e.g., in the United States, under 35 U.S.C. 101), and to specifically exclude all mediums that are non-statutory in nature to the extent the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the IoT devices 104 are intended to represent purposefully built or configured IoT devices. Examples of IoT devices include thermostats, mobile devices, biological managers, sensory devices, and functionality performing devices. In being purposely built IoT devices, the IoT devices 104 are built to have specific operational parameters. For example, a thermometer may be built to provide signals from a temperature sensor. In being purposely configured IoT devices, the IoT devices 104 can be configured to operate according to specific operational parameters in accordance with input from a human or artificial agent. For example, an IoT device of the IoT devices 104 can be a thermostat configured to control an air conditioner to cool a room to a configurable temperature at a configurable time. As another example, an agent can specify an IoT device should not communicate with a specific data source, and the IoT device can be configured to refrain from communicating with the specific data source as part of purposeful configuration.

In a specific implementation, the IoT devices 104 include wired or wireless interfaces through which the IoT devices 104 can send and receive data over wired and wireless connections. As used in this paper, the term "implementation" means an implementation that serves to illustrate by way of example and not necessarily by limitation. The IoT devices 104 can have unique identifiers that can be used in the transmission of data through a network. Unique identifiers of the IoT devices 104 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the IoT devices 104 can include applicable communication interfaces for receiving and sending data according to an applicable wireless device protocol. Examples of applicable wireless device protocols include Wi-Fi, ZigBee®, Bluetooth®, and other applicable low-power communication standards.

In a specific implementation, the IoT devices 104 act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the IoT devices 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the IoT devices 104 have respective personalities. As used in this paper, a personality is a collection of behaviors; behavior is used to describe a specific type of device. As used in this paper, a behavior is an application-driven collection of one or more related activities. A personality can be bad, which means the personality is identifiable as one that belongs to a device that exhibits or has an unacceptable risk to later exhibit undesirable behavior. A personality can be good, which means the personality is identifiable as one that belongs to a device that has not and is not expected to later exhibit undesirable behavior. Devices can exhibit anomalous behavior, and anomaly detection is a useful tool to determine whether a device is exhibiting undesirable behavior, so anomalous behavior is sometimes associated with undesirable behavior. However, over time, anomalous behavior can be indicative of an as-of-yet-unidentified, but potentially good personality. If a device with a first personality exhibits anomalous behavior, it may be possible to define a second personality similar in some ways to the first personality, but for which certain behavior is not anomalous. Similarly, a first personality could be better defined over time to include what was previously anomalous behavior as non-anomalous behavior. Accordingly, it may be desirable to provide a system that can not only classify IoT devices as having various personalities, but also to provide a system that can allow personality to have malleable definitions and that can define new personalities over time.

The IoT device activity generation engine 106 is intended to represent a system that generates IoT device activity data structures using IoT device-related events. In a specific implementation, the IoT device activity generation engine 106 is on the same LAN as the IoT devices 104. For example, the IoT device activity generation engine 106 can be implemented as a local device forming part of a LAN at a home of the IoT devices 104 and/or at a local device configured to provide the IoT devices 104 access to network services through the LAN. Instead or in addition, the IoT device activity generation engine 106, or a portion thereof, can be implemented as part of a private cloud. A private cloud implementing the IoT device activity generation engine 106, or at least a portion thereof, can be specific to an entity.

In a specific implementation, the IoT device activity generation engine 106 functions to generate activities using events that are local with respect to the IoT devices 104. In generating activities using events that are local with respect to an IoT device, the IoT device activity generation engine 106 can be implemented at a device within a LAN associated with or formed in part through the IoT device. The IoT device activity generation engine 106 can generate activity data structures from events associated with a device within a LAN for subsequent use in determining whether behavior of an IoT device is appropriate for the IoT device's profile. For example, the IoT device activity generation engine 106 can be implemented at a local agent and determine at the local agent events for use in identifying undesired behavior in IoT device operation relative to the IoT device's profile.

A significant subclass of events are network session events or "network events." In some implementations, network events can appropriately be referred to as "packet-based" (or "frame-based") events because network event capture is of packets or frames. In a specific implementation, a discrete network event is a network session. Alternatively or in addition, a discrete network event is a portion of a persistent network session that has been broken into chunks, wherein the chunks of a network session, in the aggregate, comprise a network session.

The network activities datastore 108 is intended to represent a datastore of activity data structures. In a specific implementation, at least some of the network activities include a representation of a transformed event associated with one of the IoT devices 104. As used in this paper, an activity data structure is a labeled collection of events. An activity data structure can include a representation of an event that is not a network event, such as a local database access event, an event obtained from log message(s) via an active query, or the like. Advantageously, pattern matching, described in more detail later, can be used on activities with activity data structures that include both network events and non-network events.

In an example of operation, the IoT device activity generation engine 106 performs a create, read, update, or delete (CRUD) on the network activities datastore 108. Event transformation is described in greater detail later, such as, for example, with reference to FIG. 3.

Because a network session of an IoT device of the IoT devices 104 is a network event (or a persistent network session can be "chunked" into a series of network events), the IoT device can be identified as a participant in an activity defined by an activity data structure in the network activities datastore 108 that includes a representation of the network event. In an implementation in which IoT devices are given profiles, pattern matching can take into account a profile of the IoT device to limit activity patterns to those that have been identified as most relevant. For example, an activity pattern can be generated for medical devices running on windows, which makes such activities as a binary windows download, remote RPC connection, or the like most relevant for pattern-matching purposes. As another example, patterns can be associated with applications, such as sending images to the Cloud for security devices, which is different than medical imaging devices. Various activities, such as streaming, file upload, management, etc. are different for different profiles. Due to the massive number of possibilities, it would be virtually impossible to accomplish some of the goals described in this paper without profiling, with reasonable accuracy, IoT devices. Profiling enables more selective application of compute resources for activity pattern matching of activities (which is itself far harder than matching simple features, such as is used with limited success when performing pattern matching for the purpose of detecting malware).

The IoT device profiling engine 110 is intended to represent an engine for profiling or facilitating the profiling of the IoT devices 104. An IoT device can be profiled as a thermostat, an X-Ray machine, a motion sensor, or some other type of device. Profiling can occur in advance of deployment of an IoT device. For example, a motion sensor profile may exist in the IoT device profiles datastore 112 even though a motion sensor IoT device has not been deployed in an applicable LAN. The IoT device profiling engine 110 can facilitate profiling by a human or artificial agent prior to deployment of an IoT device, such as by registering the IoT device with a network administrator. Profiling can include obtaining profile information from a local or remote datastore that includes information about the relevant IoT device, such as from a public source, a service provider, or other party. Profiling can also include manual entry of features of an IoT device profile.

In some networks, deployment of new IoT devices occurs relatively frequently, making accurate pre-profiling difficult. Accordingly, in a specific implementation, the IoT device profiling engine 110 analyzes data associated with any of the IoT devices 104 that are not yet profiled to ensure, ideally, each of the IoT devices 104 are profiled. In a specific implementation, each of the IoT devices 104 that has been profiled has a unique profile. In an alternative, a subset of the IoT devices 104 can have a plurality of provisional profiles, some of which can be eliminated over time to obtain one and only one profile, which would no longer be referred to as "provisional," for the subset of IoT devices 104. Profiling and eliminating provisional profiles can be accomplished by analysis of events in much the same way as pattern matching is described later, but it should be noted it may be computationally prohibitive to start with a relatively large number of provisional profiles. Accordingly, the IoT device profiling engine 110 must have some intelligence, or rely upon the intelligence of a human or artificial agent, enabling the IoT device profiling engine 110 to narrow the potential profiles for each IoT device. For example, the IoT device profiling engine 110 can identify a manufacturer from an IoT device MAC address and consult a datastore associated with the identified manufacturer to determine what types of devices the manufacturer uses.

Some computationally expensive techniques, such as deep packet inspection (DPI), can be used if compute resources are available and there is a desire to expend the resources. A more cost-effective technique is to limit the number of IoT device profiles allowed on a LAN and assume an IoT device has all allowed provisional profiles until such time as the IoT device can be more accurately profiled. If the IoT device profiling engine 110 needs time to profile an IoT device, an unknown IoT device quarantine engine (not shown) can interfere with IoT device operation, at least temporarily, while the IoT device profiling engine 110 attempts to profile the IoT device.

In an example of operation, the IoT device profiling engine 110 stores profiles, which may or may not include provisional profiles, in the IoT device profiles datastore 112. In a specific implementation, the profiles are stored in advance of deployment of at least one of the IoT devices 104 and are relatively static. What is meant by relatively static is a human or artificial agent must modify the IoT device profiles datastore 112 over a time period that will catastrophically impact at least some aspect of IoT device function for as-of-yet unprofiled IoT devices or will allow IoT devices to operate without first being profiled (the latter may be characterized as giving unknown devices a "default" profile). For example, if, in a given time span, the IoT device profiling engine 110 fails to match an IoT device to a profile in the IoT device profiles datastore 112, a network administrator may receive an alert prompting the network administrator to take action in association with the profiling of the as-of-yet unprofiled (or "default" profiled) IoT device, which may include adding a new profile to the IoT device profiles datastore 112. The IoT devices 104 are linked to the applicable profiles in the IoT device profiles datastore 112. At least conceptually, the association of an IoT device with its profile is assumed to be part of the IoT device profiles datastore 112, though information defining such an association could be included in an IoT device datastore (not shown).

IoT devices can be grouped together to form a profile, based on one or a combination of characteristics of the IoT devices, operational characteristics of the IoT devices, and characteristics of the environment in which the IoT devices operate. For example, all thermostat IoT devices of a specific manufacturer can be grouped together to form a profile. In general, the IoT device profiling engine 110 profiles the IoT devices 104 using whatever data is identifiable as useful for the profiling process, such as MAC address, IP address (of a source or destination, typically), packet size, UID, or the like. Depending upon implementation-specific or other considerations, a profile includes normal operating behavior patterns of IoT devices in the group, undesired operating behavior patterns of the IoT devices in the group, or both.

In the example of FIG. 1, the IoT device activity pattern matching engine 114 is intended to represent a system for determining whether activities of the IoT devices 104, which are included in the network activities datastore 108, are appropriate for the profiles respectively attributed to the IoT devices 104, as stored in the IoT device profiles datastore 112, by matching the activities of a first subset of the IoT devices 104 having a first profile to a first subset of the patterns in the activity patterns datastore 116 associated with the first profile, the activities of a second subset of the IoT devices 104 having a second profile to a second subset of patterns in the activity patterns datastore 116 associated with the second profile, and so on to the $n^{th}$ subset and profile. Matching an expected pattern to determine IoT device function as expected is equivalent to failing to match an unexpected pattern, but the term "matching" is generally used in this paper with the understanding that context will determine whether A equals B is a match or A is not equal to B is a match. To the extent "does not match" or the equivalent is used in this paper, it will generally be for the purpose of readability, with the same understanding elucidated in the previous sentence.

In the diagram 100, the IoT device activity pattern matching engine 114 includes an IoT device expected behavior pattern matching (sub)engine 118, an IoT device anomalous behavior pattern matching (sub)engine 120, an activity identification (sub)engine 122, and a threat detection (sub) engine 124. It may be noted, however, that the matching of a pattern can be accomplished agnostically, making it unnecessary to implement separate engines for the purpose of pattern matching; in a typical implementation, the IoT device expected behavior pattern matching engine 118 and the IoT device anomalous behavior pattern matching engine 120 are only conceptually distinct. Undesired behavior is defined by an institutional or security system as undesirable. It may be noted that an IoT device with a good personality can exhibit anomalous behavior and still be considered to have a good personality while an IoT device with a bad personality need not exhibit anomalous behavior and still be considered to have a bad personality. This is made of note because techniques used to identify undesired behavior can include anomaly detection, but anomaly detection is not the universe of undesired behavior detection. Accordingly, in a specific implementation, pattern matching includes application of patterns associated with normal behavior patterns, abnormal behavior patterns, or both. As used in this paper, a personality includes mathematically modelled behavior patterns, with institutional knowledge built into the personality model. Examples of bad personality include behavior associated with bots, C&C centers (botnet), or servers taken over by malware, to name three, all of which can have recognizable behaviors.

In a specific implementation, the IoT device expected behavior pattern matching engine 118 applies a pattern from the activity patterns datastore 116 to an activity data structure of the network activities datastore 108 for the purpose of determining whether detected IoT device function falls within acceptable parameters for a profile in the IoT device profiles datastore 112 that have been attributed to the IoT device. If the relevant profile has more than one associated pattern, the IoT device expected behavior pattern matching engine 118 applies a second pattern to IoT device events and so on until each pattern has been applied. If the behavior of an IoT device does not match each of the patterns of the profile attributable to the IoT device, the IoT device expected behavior pattern matching engine 118 generates an alert. Alerts can have differing weights, which can vary depending upon implementation-specific or other considerations. A low priority alert can be characterized as an alert that is associated with a behavior that is (at the moment) considered benign. Equivalently, the IoT device expected behavior pattern matching engine 118 can treat deviation from a pattern as within acceptable parameters and generate no explicit alert. A high priority alert can be characterized as an alert that is associated with a behavior that is considered malicious or risky and that triggers automatic countermeasures.

In a specific implementation, the IoT device expected behavior pattern matching engine 118 assists the IoT device profiling engine 110 in profiling an IoT device with a default or provisional profile. For example, the IoT device expected behavior pattern matching engine 118 can work through a hierarchy of profiles using historic behavior identifiable, at least in part, using activity data structures in the network activities datastore 108 until finding an appropriate match, which is provided back to the IoT device profiling engine 110 to assist in profiling the IoT device. The hierarchy of profiles can be organized such that the most likely candidate profiles are assumed first.

In a specific implementation, the IoT device anomalous behavior pattern matching engine 120 applies a pattern to IoT device events for the purpose of determining whether IoT device function falls outside of acceptable parameters for a profile attributable to the IoT device. If the relevant profile has multiple associated patterns, the IoT device anomalous behavior pattern matching engine 120 applies a second pattern to IoT device behavior and so on until each pattern has been applied. If the behavior of an IoT device matches any of the patterns of the profile attributable to the IoT device, the IoT device anomalous behavior pattern matching engine 120 generates an alert. For illustrative purposes, the anomalous behavior patterns are matched when the recorded IoT device behavior is indicative of anomalous behavior. As was indicated previously, alerts can have variable weight that depends upon a number of factors, with an identification of deviation from policy or an identification of behavior associated with malicious IoT devices generally being more deserving of higher weight than behavior that may simply be indicative of acceptable operations that have not yet been incorporated into a pattern.

The activity identification engine 122 is capable of identifying activities generated by the activity generation engine 106 and/or stored in the network activities datastore 108.

The threat detection engine 124 can use unsupervised learning (clustering-based algorithms, partition-based algorithms, neural net-based algorithms, etc.) to discover threats.

In an example of operation, an engine of the IoT device activity pattern matching engine 114 matches an activity data structure in the network activities datastore 108 only to the subset of patterns in the activity patterns datastore 116 that are associated with a profile in the IoT profiles datastore 112 attributed to an IoT device that is associated with the activity data structure. If there is a match (or, equivalently, a failure to match) a pattern, an alert may or may not be generated. In general, the graver the security risk, the greater the likelihood an alert will be generated.

Figure 2:
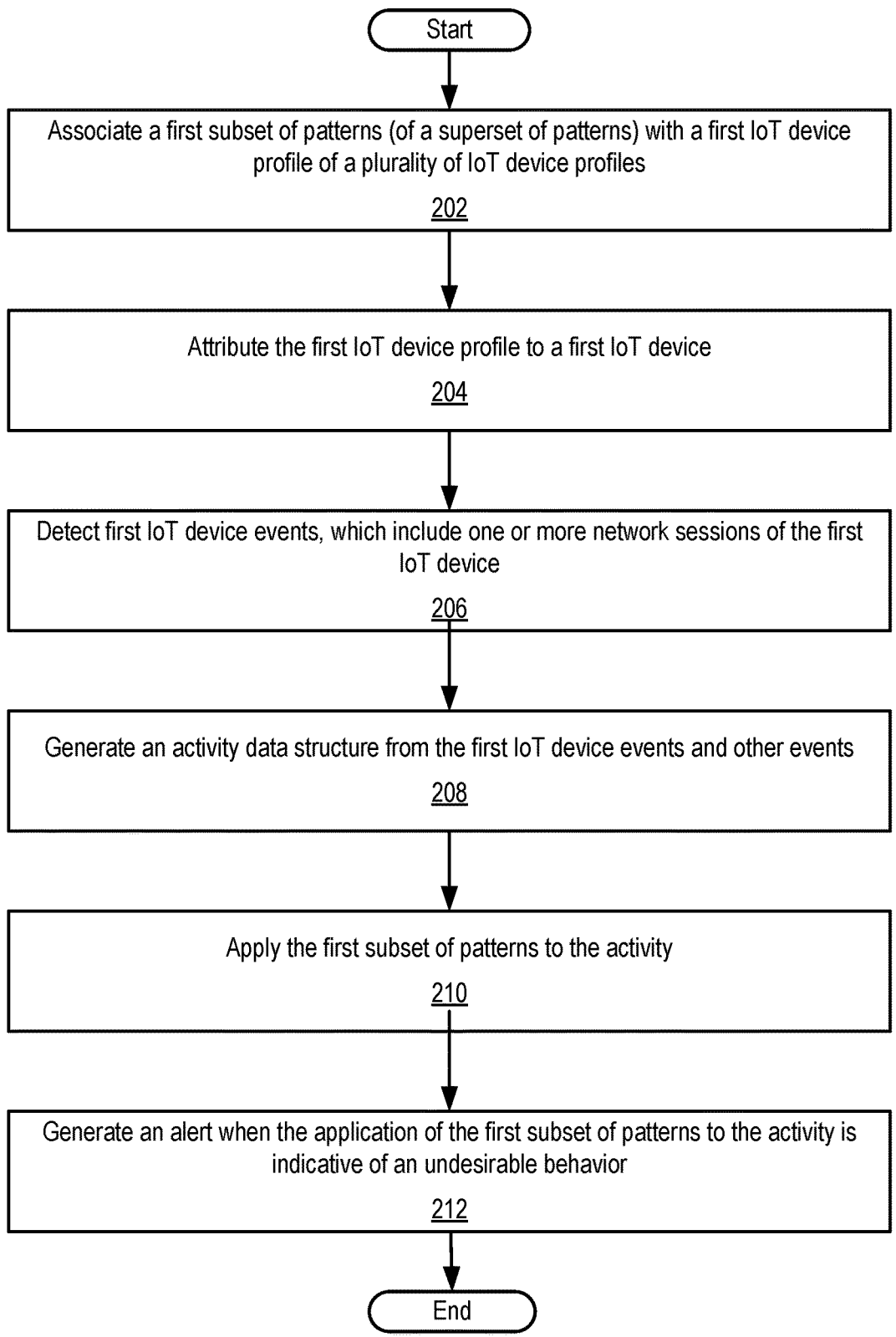
FIG. 2 depicts a flowchart of an example of a method for pattern match-based detection in IoT security.

FIG. 2 depicts a flowchart 200 of an example of a method for matching IoT device behavior to a subset of patterns associated with a profile attributable to the IoT device. The flowchart 200 and other flowcharts described in this paper have modules that can be sequentially reordered or reorganized into parallel sequences if applicable. The flowchart 200 begins at module 202, where a first subset of patterns (of a superset of patterns) is associated with a first IoT device profile of a plurality of IoT device profiles. Advantageously, by limiting a pattern matching engine to patterns associated with a given profile, it is possible to reduce required compute to a level that makes pattern matching to IoT device activity useful in practice. Indeed, it will even be possible to scale as IoT networks increase in size and the types of IoT devices grow by orders of magnitude.

The flowchart 200 continues to module 204, where the first IoT device profile is attributed to a first IoT device. In a simplistic scenario, the first IoT device profile can be attributed to a first IoT device by a network administrator prior to deployment. However, IoT networks can be dynamic, making it desirable to profile IoT devices after they are deployed, which can include pattern matching behavior of an IoT device to a default IoT device profile and using available data to (ideally) quickly profile the as-of-yet unprofiled IoT device. It may be desirable to quarantine or otherwise deploy countermeasures against all as-of-yet unprofiled IoT devices either immediately upon detection or after a grace period during which profiling is attempted.

The flowchart 200 continues to module 206 where first IoT device events, which include one or more network sessions of the first IoT device, are detected. In a specific implementation, the events are detected via passive monitoring. A rather trivial type of detected events are perhaps messages to or from the first IoT device. It may be desirable to focus on detecting discrete events that take relatively few resources to characterize, such as information in a packet header, though other more resource-intensive techniques, such as DPI, can be used to obtain even more event data.

The flowchart 200 continues to module 208, where an activity data structure is generated from the first IoT device events and other events. An aspect of the generation of an activity data structure is abstraction, which entails a loss of data associated with events in favor of a more useful characterization of activities associated with IoT devices. An activity can be defined as a labeled collection of events, so labeled because it has proven value. Abstraction can involve techniques to qualify events, such as aggregation, enrichment, and translation. A rather trivial example of aggregated events is a collection of heartbeat messages transmitted periodically by the first IoT device and treated as a composite (aggregated) event. However, aggregated events can be much more complex and even incorporate data that would not necessarily be associated with the first IoT device, but for a determination that a correlation between the first IoT device and an otherwise unrelated event has been identified. In a specific implementation, discrete events are aggregated to form composite events using machine learning. Common factor aggregation is a way to apply various different machine learning and deep learning algorithms by focusing on common factors (like all devices of same profile, same OS, using Windows, using telnet, all devices talking to a specific subnet, to name several) as applied to both detected and modeled behavior. For example, session events can be aggregate together. In another example, streaming events can be aggregated together. The events can be aggregated locally with respect to the first IoT device. For example, the events can be aggregated to form the aggregated events by a device implemented as part of a LAN with the first IoT device. It should be noted aggregated events that are labeled may be referred to as "activities" in this paper, but more generally activities are a labeled collection of one or more events, which can be discrete or aggregated. Enrichment involves associating data (potentially including other events) with events. Translation involves converting the raw event data into a format more suitable to activity characterization.

The flowchart 200 continues to module 210, where the first subset of patterns is applied to the activity. The activity serves as a (portion of a) signature of the first IoT device. The patterns are limited by the first profile. For example, patterns for a profile of a medical device running on Windows® can include a binary windows download pattern and a remote RPC connection from medical device pattern, which would be unnecessary patterns for comparison to a security camera IoT device signature, for which a pattern associated with sending images to the cloud may be more appropriate. A regular expression is a way to define a pattern, but other ways can be used as well and, in a specific implementation, at least one pattern defies being defined using a regular expression. It should be noted patterns can map to physical layer activity and, as such, can be characterized as lower in a hierarchical representation of behavior than higher-layer events, activities (particularly when defined as a labeled collection of events), and behavior (particularly when defined as an application-driven collection of one or more related activities). In a specific implementation, however, patterns are mapped to activities.

Conceptually, patterns can be characterized as detecting relevant activities for a profile, such as streaming, file upload, management, or the like, along with features and/or dominant trends (e.g., for a security camera, streaming is dominant). In a specific implementation, the universe of activities is distilled into a relatively small set (e.g., defined activities can be limited to a hundred or fewer generally human-readable aggregated events, such as login, authentication, update request, download, install, etc.). In a specific implementation, a plurality of lightweight engines focus on a respective plurality of activities (e.g., downloads) or a relatively common subset of an activity (e.g., Windows® downloads). Because the first IoT device has been profiled and the first subset of patterns is a manageable subset of all possible patterns, it becomes possible to compare IoT device signature to known acceptable or unacceptable signatures in near real time. Advantageously, a complete library of patterns cannot be applied, but because IoT devices are first profiled, it is possible to be more selective while retaining precision.

The flowchart 200 continues to module 212, where an alert is generated when the application of the first subset of patterns to the activity is indicative of an undesirable behavior. It is worth noting that it can be advantageous to map activities to desired behaviors, as well, but an expected implementation of techniques described in this paper is for IoT network security, which will likely include alert generation when undesirable behavior is detected. Undesirable behavior can include anomalous behavior or normal behavior for an IoT device with a bad personality.

Figure 3:
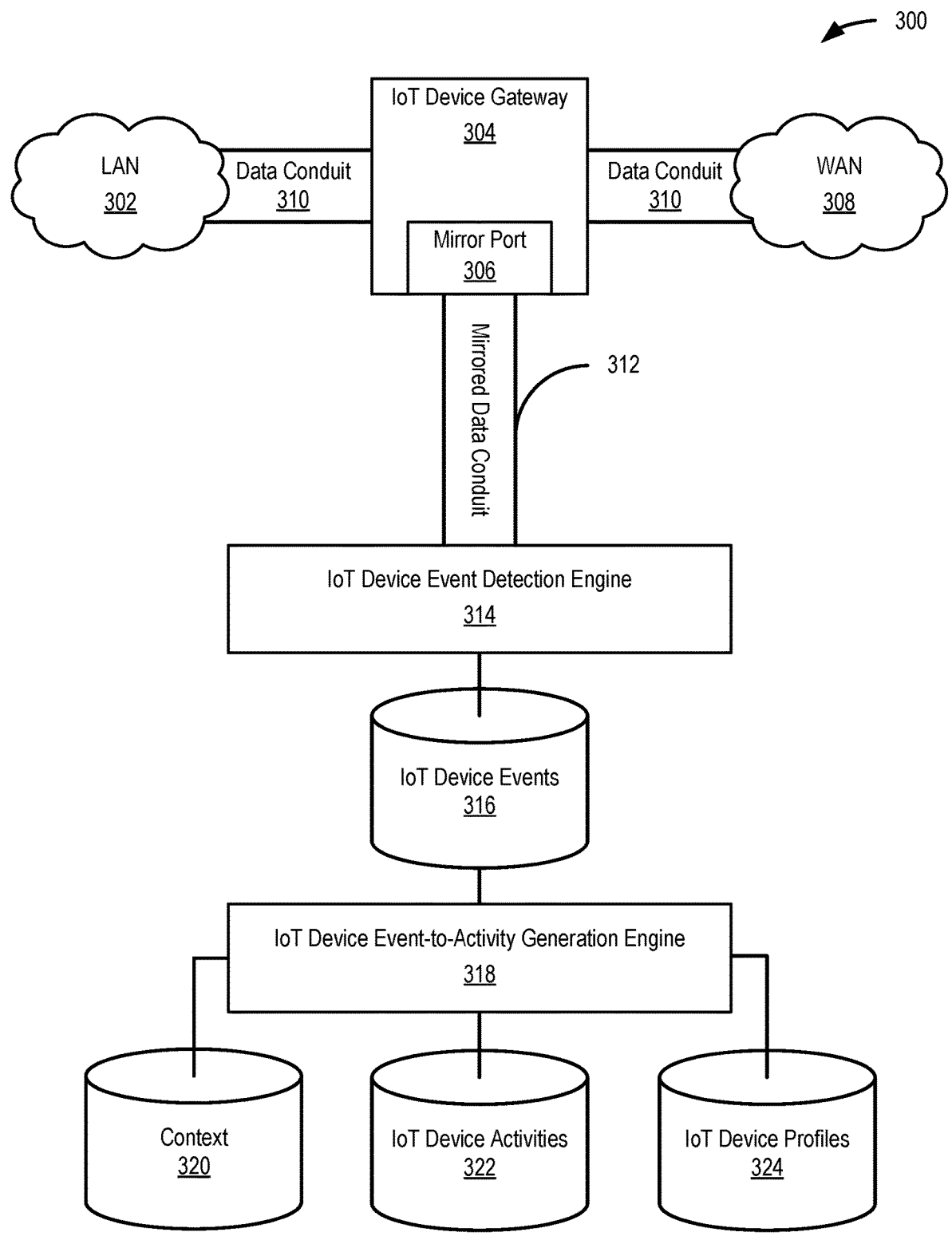
FIG. 3 depicts a diagram of an example of an IoT device activity generation system that includes a mirrored gateway.

FIG. 3 depicts a diagram 300 of an example of an IoT device activity generation system that includes a mirrored gateway. The diagram 300 includes a LAN 302, an IoT device gateway 304, a WAN 308, a data conduit 310, a mirrored data conduit 312, an IoT device event detection engine 314, an IoT device events datastore 316, an IoT device event-to-activity generation engine 318, an IoT device activities datastore 320, and an IoT device profiles datastore 322.

The LAN 302 is intended to represent a relatively local network of IoT devices (and potentially other devices). It should be noted enterprise networks can include geographically distributed LANs coupled across WAN segments. In a distributed enterprise network, local gateways comparable to the IoT device gateway 304 may be local at each LAN (each LAN is sometimes referred to as a Basic Service Set (BSS) in IEEE 802.11 parlance, though no explicit requirement is suggested here) or localized using, e.g., VLAN tunneling (the connected LANs are sometimes referred to as an Extended Service Set (ESS) in IEEE 802.11 parlance, though no explicit requirement is suggested here), though some form of gateway functionality is generally still needed to connect the various LANs in a geographically distributed enterprise network.

The IoT device gateway 304 is intended to represent a gateway between the LAN 302 and the WAN 306. In the diagram 300, the IoT device gateway 306 includes a mirror port 306. In a specific implementation, the IoT device gateway 304 is capable of distinguishing between some IoT device traffic and non-IoT device traffic and mirroring less than all of the total traffic, specifically excluding at least some of the non-IoT device traffic when mirroring. Instead or in addition, there may be a plurality of gateways implemented, one of which is the IoT device gateway 304 and one of which is a non-IoT device gateway (not shown). Of course, an agnostic gateway that does not distinguish between IoT device traffic and non-IoT device traffic is straight-forward in implementation; such an implementation would leave it to the IoT device event detection engine 314 to omit non-IoT device traffic from consideration either entirely or at least when performing IoT device-specific tasks.

The WAN 308 is intended to represent the Internet, which includes at least some hardware that is outside the control of the enterprise (or other entity) that is responsible for the administration of the LAN 302.

The data conduit 310 is intended to represent a CRM through which traffic is sent from the LAN 302 through the IoT device gateway 304 to a destination coupled to the WAN 308 and from a source coupled to the WAN 308 through the IoT device gateway 304 to an IoT device on the LAN 302.

The mirrored data conduit 312 is intended to represent a CRM through which at least a portion of the traffic from the data conduit 310 is duplicated. The mirror port 306 of the IoT device gateway 304 mirrors at least a portion of the traffic on the data conduit 310 and directs the mirrored portion through the mirrored data conduit 312 to the IoT device event detection engine 314.

The IoT device event detection engine 314 is intended to represent an engine that detects messages sent and/or received by IoT devices on the LAN 302 and stores the events (or representations of the events) in the IoT device events datastore 316. In a specific implementation, the IoT device event detection engine 314, or a portion thereof, is implemented on the same physical device as the IoT device gateway 304. Instead or in addition, the IoT device event detection engine 314, or a portion thereof, can be provided by an Internet service provider directly purchased by a consumer and acting as a conduit between networks.

In a specific implementation, the IoT device event detection engine 314 functions to detect network events associated with messages transmitted by (or to) an IoT device. For example, the IoT device event detection engine 314 can detect one or a plurality data packets transmitted by (or to) an IoT device, which can subsequently be used to generate an activity data structure in association with the IoT device, which is, in turn, used to determine whether the IoT device is behaving appropriately for the IoT device's given profile.

In a specific implementation, the IoT device event detection engine 314 generates event parameters from protocol data units (PDUs), such as frames, packets, segments, and/or datagrams, while refraining from storing the PDUs. Specifically, the IoT device event detection engine 314 can generate event metadata from PDUs transmitted to and from an IoT device, without locally storing the actual PDUs in non-volatile storage. (This should not be construed to mean the IoT device events datastore 316 is ipso facto implemented as non-volatile storage.)

The IoT device events datastore 316 is intended to represent a datastore of detected events or data representative of detected events. In a specific implementation, the IoT device events datastore 316 includes an event buffer. An event buffer includes a collection of events and features that are held for a period of time. An event buffer can be specific to a profile associated with an IoT device. For example, an event buffer can be associated with IoT devices of a specific device type. Alternatively or in addition, an event buffer can be specific to events that are one or a combination of device sensor events, session events, application events, user events, protocol events, and status events. The manner in which events are stored may or may not depend upon the nature of patterns that will be later applied to events for the purpose of determining acceptable or unacceptable IoT device behavior. In a specific implementation, the patterns include symbols (i.e., the physical layer PDU). Instead or in addition, the patterns can include elements matchable to frames, packets, or segments/datagrams, or components thereof. In some implementations, patterns can also be matched to session, presentation, and/or application layer protocols or components.

The IoT device event-to-activity generation engine 318 is intended to represent an engine that functions to identify activities from events represented in the IoT device events datastore 316 for storage in the IoT device activities datastore 320. In a specific implementation, the IoT device event-to-activity generation engine 318 determines one or a combination of device sensor events, session events, application events, user events, protocol events, and status events included as part of an activity. Device sensor events can include events that occur at the physical layer of the physical layer or data link layer of the open system interconnection (hereinafter referred to as "OSI") model. For example, device sensor events can include a virtual LAN (hereinafter referred to as "VLAN") used by an IoT device to communicate with a specific data source. Session events can include events that occur at either the network layer or the transport layer of the OSI model. For example, session events can include a specific network type used by an IoT device to communicate with a source. Application events include events that occur at one or a combination of the session layer, the presentation layer, and the application layer of the OSI model. For example, application events can include an identification of an application executed at an IoT device in accessing network services. Device events can include events that occur at a specific device. User events can include events that occur in associated with a specific user interacting with an IoT device. For example, user events can include specific instances in which a specific user interacts with IoT devices. Status events can include events associated with whether an IoT device is operating. For example, status events can include an event indicating whether an IoT device is operating within a given operational efficiency range.

In a specific implementation, the IoT device event-to-activity generation engine 318 identifies activity parameters (data or metadata) by analyzing data packets. For example, if a data packet can be correlated with a specific application, then the IoT device event-to-activity generation engine 318 can identify an activity parameter of the specific application is executed in association with an IoT device. The IoT device event-to-activity generation engine 318 can use packet header analysis to identify activity parameters from data packets transmitted to or from an IoT device. Alternatively or in addition, the IoT device event-to-activity generation engine 318 can use deep packet inspection to identify activity parameters from data packets. For example, the IoT device event-to-activity generation engine 318 can use deep packet inspection to analyze a payload of a data packet sent from an IoT device and subsequently identify an activity parameter from the data packet. As another example, the IoT device event-to-activity generation engine 318 can correlate one or a plurality of data packets transmitted by (or to) an IoT device to an activity of a specific application being executed on the IoT device.

In a specific implementation, the IoT device event-to-activity generation engine 318 functions to qualify events using profile-based aggregation. Events can be associated with a specific profile, such as sending X-ray images for an IoT device profiled as an X-ray machine. For example, the IoT device event-to-activity generation engine 318 can qualify events based on recipients of data packets transmitted from an IoT device of a given profile. As another example, if an IoT device exchanges data with a remote device every night (discrete events), the discrete events can be aggregated. As another example, the IoT device event-to-activity generation engine 318 can aggregate events based on an IoT device ID or a port used transmit data packets to or from an IoT device of a given profile. As another example, the IoT device event-to-activity generation engine 318 can aggregate events based on whether the events are one or a combination of device sensor events, session events, application events, user events, protocol events, and status events. Advantageously, qualification based on remote, per application, per IP, or other factors can be on a granular level.

The context datastore 320 is intended to represent a datastore of IoT network-related data that aids the IoT device event-to-activity generation engine 318 in qualitatively evaluating IoT device events represented in the IoT device events datastore 316.

The IoT device activities datastore 322 is intended to represent a datastore of activity data structures that have been derived from qualified (e.g., aggregated, enriched, or otherwise qualified, and transformed) events or data representative of events from the IoT device events datastore 316 by the IoT device event-to-activity generation engine 318 with reference to the context datastore 320. As used in this paper, activities are a labeled collection of one or more events. Where the activity includes one and only one event, the activity can be referred to as a discrete event. Where the activity includes more than one event, the activity can be referred to as a composite event. It may be noted that not all aggregated events are activities because, by definition, an activity is a labeled collection of events; however, unlabled aggregated events can become activities if the aggregated events are later labeled.

The IoT device profiles datastore 324 is intended to represent a datastore of profile templates for IoT devices and/or profiles of IoT devices on the LAN 302. As used in this paper, each IoT device on the LAN 302 is presumed to have a profile that is either extant in the IoT device profiles datastore 324 or as-of-yet unidentified. At least conceptually, IoT devices for which a more precise profile has not been identified can have a "default" profile, a provisional profile, or a "best guess" profile. Indeed, some or even all IoT device profiles could be considered "best guess" profiles because there is no reason to assume an IoT device cannot be tricky to profile initially, become infected, or begin behaving erratically, at some point. The IoT device event-to-activity generation engine 318 will treat events differently depending upon the profile of an IoT device with which the event is associated. Specifically, different device profiles can be associated with different aggregations, different prioritization of enrichment data from device history, most useful normalization regarding packet count, to name a few.

Referring once again to the IoT device event-to-activity generation engine 318, in a specific implementation, the IoT device event-to-activity generation engine 318 functions to generate analytics features from events in the IoT device events datastore 316. An analytics feature is a transformation of one or more timestamped events, including composite events. As used in this paper, a composite event comprises multiple event parameters, but is referred to as an "event," which is a more general term intended to represent a discrete event or a combination of event parameters (which can include one or more discrete events). For example, a discrete event, such as a signal transmitted from a thermometer associated with a discrete temperature sensing instance, can be combined with an event parameters for the destination of the signal, historical signal transmissions, transmissions of similarly classified IoT devices, and the like, to generate a composite event. In a specific implementation, the IoT device event-to-activity generation engine 318 generates analytics features of IoT devices using messages transmitted to or from IoT devices on the LAN 302. For example, the IoT device event-to-activity generation engine 318 can examine messages transmitted to an IoT device to determine an event which can subsequently be timestamped to create an analytics feature of the IoT device. In a specific implementation, the IoT device event-to-activity generation engine 318 generates analytics features of the IoT devices within a data rollup window (or time window). For example, the IoT device event-to-activity generation engine 318 can examine all messages transmitted from an IoT device within a one hour period to determine a feature of the IoT device. As another example, the IoT device event-to-activity generation engine 318 can examine packets transmitted from a first IoT device over a 24 hour period and examine packets transmitted from a second IoT device over a five minute period to extract features of the first and second IoT devices. A data rollup window used by the IoT device event-to-activity generation engine 318 to extract features of IoT devices can vary depending on IoT device profile. For example, the IoT device event-to-activity generation engine 318 can vary data rollup windows used to extract features of IoT devices in operation depending upon whether the IoT device is a thermometer or an X-Ray machine.

Figure 4:
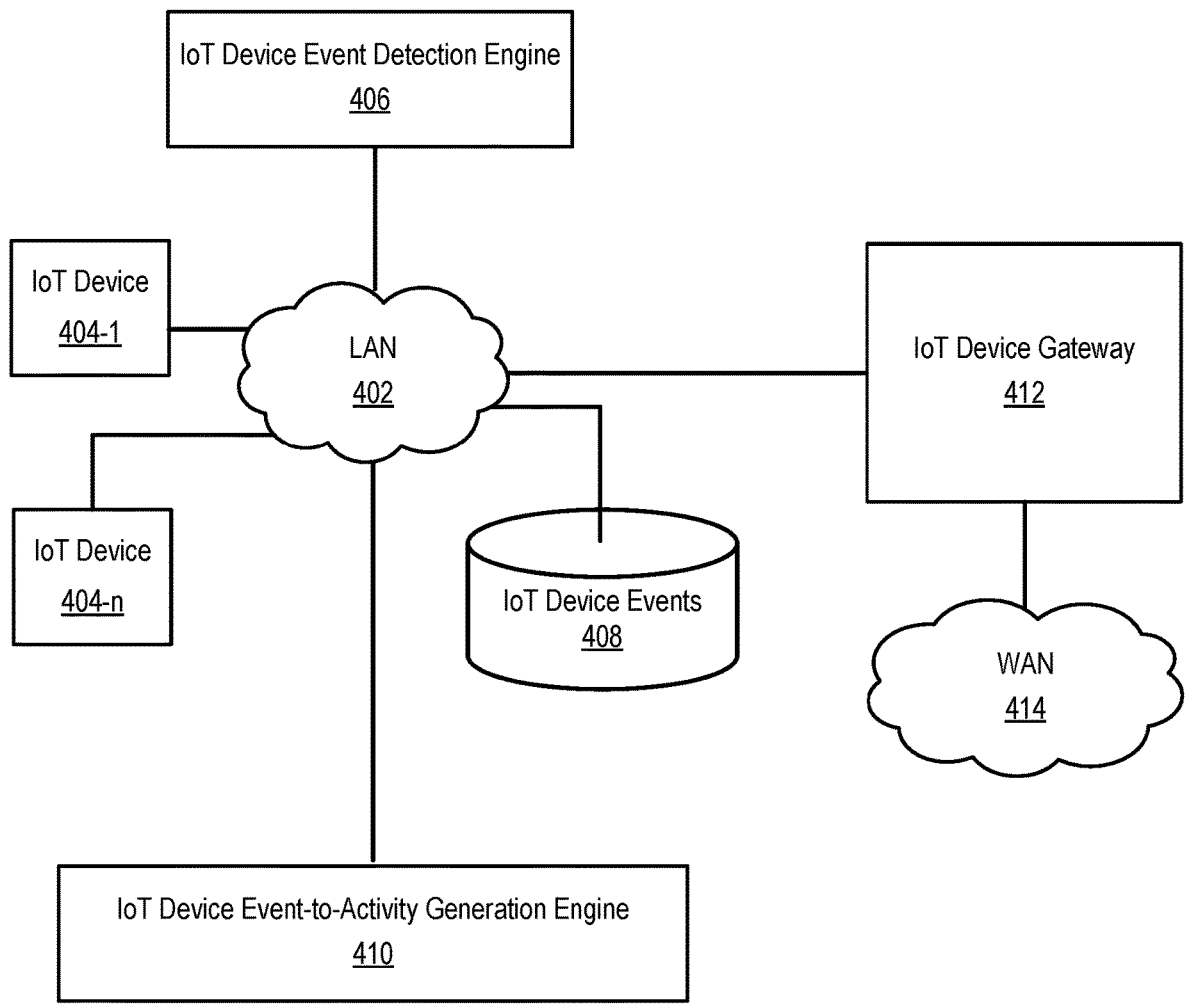
FIG. 4 depicts a diagram of an example of an IoT device activity generation system that includes localized agents.

FIG. 4 depicts a diagram 400 of an example of an IoT device activity generation system that includes localized agents. The diagram 400 includes a LAN 402, IoT device 404-1 to IoT device 404-n (collectively, the IoT devices 404), an IoT device event detection engine 406, an IoT device events datastore 408, an IoT device event-to-activity generation engine 410, an IoT device gateway 412, and a WAN 414. Components illustrated in diagram 400 can include some of the functionality of components described by the same name in the example of FIG. 3.

For illustrative purposes, the LAN 402 is depicted as distinct from devices that would normally be considered "on" the LAN 402. The IoT devices 404 are intended to act as an example of devices that are "on" the LAN 402. The LAN 402 and the IoT devices 404 can be characterized as an IoT LAN.

The IoT device event detection engine 406 is intended to represent one or more agents that are also on the LAN 402. A local agent may include software implemented on a physical device on the LAN 402. In a specific implementation, at least a portion of the IoT device event detection engine 406 is implemented through one or more local agents on one or more of the IoT devices 404, one or more dedicated IoT device event detection devices, the IoT device gateway 412, or some other device; intelligence can be distributed. Local coupling involves operationally connecting a local agent via a LAN interface (or a smaller network interface, such as a PAN interface) to the IoT devices 404. In a distributed enterprise network, the local agents may be local at each LAN (each LAN is sometimes referred to as a Basic Service Set (BSS) in IEEE 802.11 parlance, though no explicit requirement is suggested here) or localized using, e.g., VLAN tunneling (the connected LANs are sometimes referred to as an Extended Service Set (ESS) in IEEE 802.11 parlance, though no explicit requirement is suggested here). Depending upon implementation-specific or other considerations, the IoT device event detection engine 406 can include wired communication interfaces and wireless communication interfaces for communicating over wired or wireless communication channels.

Instead or in addition, at least a portion of the IoT device event detection engine 406 can be implemented remote relative to IoT devices 404. For example, at least a portion of the IoT device event detection engine 406 can be implemented in a cloud based system. In this example, portions of the IoT device event detection engine 406 implemented remote relative to IoT devices 404 may receive data associated with the IoT devices 404 through virtual private network (hereinafter "VPN") tunnels. For example, the IoT device event detection engine 406 can receive outbound network traffic sent from IoT devices 404 over a VPN tunnel. Additionally, VPN tunnels through which the IoT device event detection engine 406 can send and receive data can be maintained using dedicated networking equipment. For example, the IoT device event detection engine 406 can receive data associated with the IoT devices 404 using dedicated routers for communicating with the IoT devices 404.

In operation, the IoT device event detection engine 406 saves IoT device events in the IoT device events datastore 408 for use by the IoT device event-to-activity generation engine 410. In a specific implementation, at least a portion of the IoT device event-to-activity generation engine 410 is implemented through one or more local agents on one or more of the IoT devices 404, one or more dedicated IoT device event detection devices, the IoT device gateway 412, or some other device; intelligence can be distributed.

The IoT device gateway 412 provides an outlet for a subset of the IoT device messages from the IoT devices 404 to the WAN 414 and an inlet for the IoT device messages bound for the IoT devices from the WAN 414. The IoT device gateway 412 may or may not obtain and provide additional data (e.g., from non-IoT device messages), which can be provided to the IoT device event-to-activity generation engine 410, if applicable.

Figure 5:
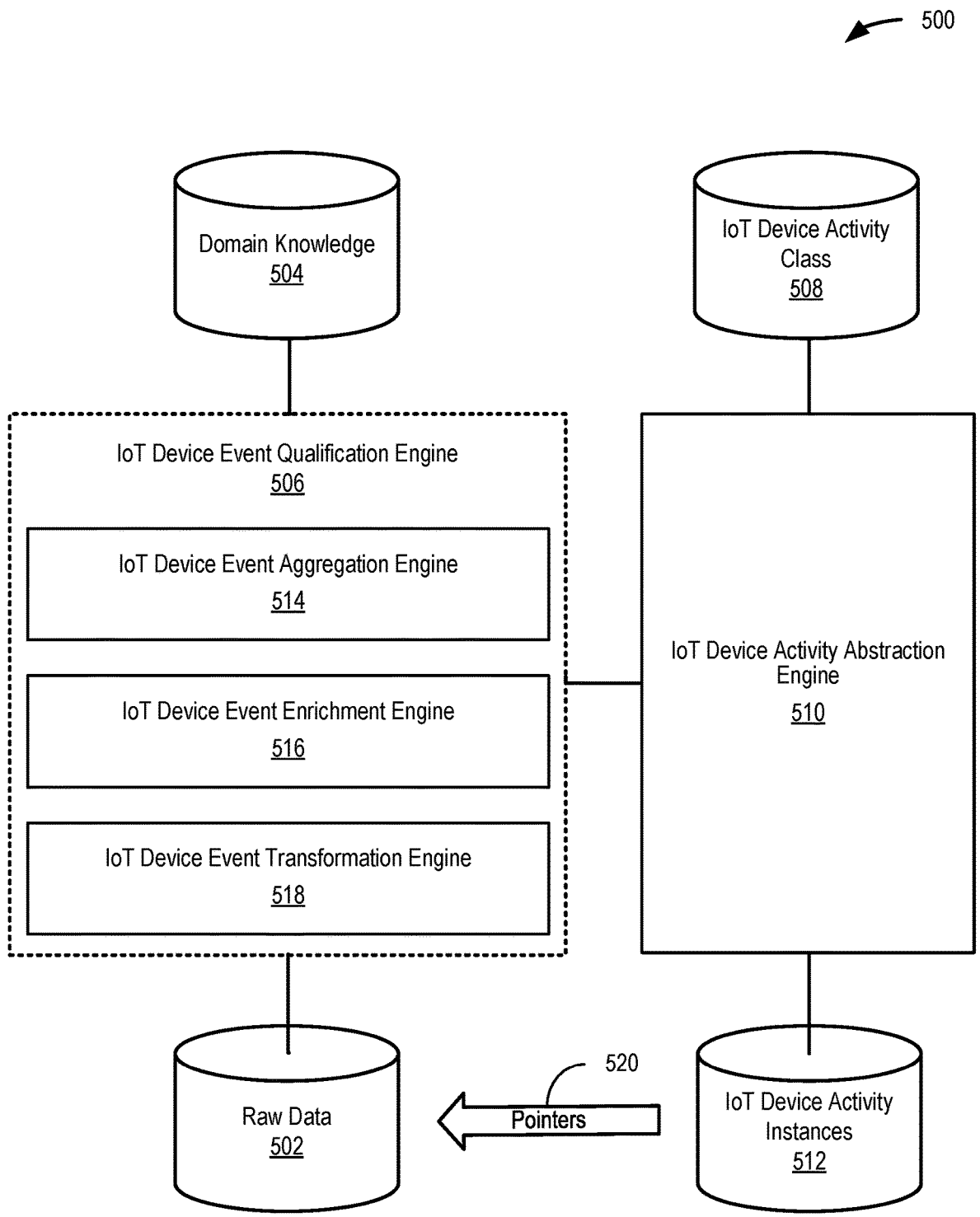
FIG. 5 depicts a diagram of an example of an IoT device activity abstraction system.

FIG. 5 depicts a diagram 500 of an example of an IoT device activity abstraction system. Such a system can be incorporated into an IoT device activity generation system. See, e.g., the IoT device event-to-activity generation engine 318 of FIG. 3, the IoT device event-to-activity generation engine 410 of FIG. 4, or, more generally, the IoT device activity generation engine 106 of FIG. 1. The diagram 500 includes a raw data datastore 502, a domain knowledge datastore 504, an IoT device event qualification engine 506, an IoT device activity class datastore 508, an IoT device activity abstraction engine 510, and an IoT device activity instances datastore 512.

The raw data datastore 502 is intended to represent a collection of datastores described previously in this paper, including datastores of IoT device events, context, IoT device profiles, or the like. There may be some cross-over between, for example, context and IoT device profiles and domain knowledge, but a clear distinction is not necessary for an understanding of FIG. 5.

The domain knowledge datastore 504 is intended to represent rules and templates that have been devised from external sources, administrative input, machine learning results, or the like. Domain knowledge enables more sophisticated qualification of events by, for example, templating a composite login event such that a login-related event can be aggregated with other expected login events in an effort to conform to the domain knowledge composite login event template.

The IoT device event qualification engine 506 is intended to represent an engine that identifies relevance of and between raw data, including at least one event, from the raw data datastore 502 using rules and/or templates from the domain knowledge datastore 504. "Qualification" is intended to mean any characterization of raw data, and in particular an event, such that an abstraction of the raw data takes on improved predictive power. As such, qualification can include aggregation, enrichment, and transformation. (It should be noted that "quantification" may also be applicable, and should, if appropriate, be considered part of qualification if not distinguished, either by context or explicitly.)

In the diagram 500, the IoT device event qualification engine 506 includes an IoT device event aggregation engine 514, an IoT device event enrichment engine 516, and an IoT device event transformation engine 518. The IoT device event aggregation engine 514 is intended to represent an engine that aggregates events. In a trivial example, a persistent network session can be broken into multiple intervals (events), which can be aggregated to form a composite event comprising each interval of a persistent network session. The IoT device activity abstraction engine 510 can treat the composite event as a single activity data structure parameter (assuming the composite event is not abstracted even further, through, for example, aggregation with other events). In a specific implementation, the IoT device event aggregation engine 514 aggregates by IoT device profile type. Advantageously, aggregating by profile type can make large amounts of data manageable. Alternatively or in addition, the IoT device event aggregation engine 514 aggregates events by one or more of source, destination, user, duration, time-of-day, and application, to name several options, in accordance with aggregation rules in the domain knowledge datastore 504. Alternatively or in addition, the IoT device event aggregation engine 514 uses a composite event template in the domain knowledge datastore 504 to aggregate discrete events that match characteristics of components of the composite event template.

The IoT device enrichment engine 516 is intended to represent an engine that appends data to events. For example, the IoT device enrichment engine 516 could append an IoT device history or IoT device information to a network event that has the IoT device as a source to form a composite event. The IoT device activity abstraction engine 510 can treat the composite event as a single activity data structure parameter, but, for example, with greater confidence. Other data that can be appended can include, for example, network conditions at the time an event is detected, user information for an account associated with an IoT device, and errata associated with the function of an application or device, to name several.

The IoT device event transformation engine 518 is intended to represent an engine that converts events and their associated data from the raw data datastore 502 into a format suitable for incorporation into an activity data structure. For example, translation can include categorization of byte counts of an event into four categories (e.g., 0-100 KB, 100 KB-10 MB, 10 MB-1 GB, and over 1 GB). The IoT device activity abstraction engine 510 can treat events of the same category similarly, without considering exact byte counts, which have been determined to be more precise than is useful. Other translations can include, for example, translating an IP into a URL, normalization by packet count to a universal scale, and converting the organizationally unique identifier (OUI) of a MAC address into a manufacturer, to name several.

The IoT Device activity class datastore 508 is intended to represent a datastore of one or more activity data structure templates. In an object-oriented programming context, the templates can be defined as extensible program-code-templates for creating activity data structure instances (e.g., objects). As used in this paper, the term "class" is intended to be construed a bit more broadly unless either an object-oriented approach is used explicitly indicated or context indicates as much.

The IoT device activity abstraction engine 510 is intended to represent an engine that creates an instance of an activity data structure from the IoT device activity class datastore 508, applies values abstracted from one or more qualified composite events from the IoT device event qualification engine 506 to parameters of the instantiated activity data structure, and create a new IoT device activity data structure instance for the IoT device activity instances datastore 512. In a specific implementation, the IoT device activity abstraction engine 510 can also update, read from, or delete from the IoT device activity instances datastore 512, as merited by the results of an abstraction process.

Advantageously, although data is necessarily "lost" when instantiating (what is expected in a specific implementation to be a huge number of) abstractions from (what is expected in a specific implementation to be massive amounts of) raw data, the IoT device activity abstraction engine 510 can maintain pointers to applicable raw data, as is represented in the example of FIG. 5 by the pointers arrow 520 from the IoT device activity instances datastore 512 to the raw data datastore 502. In this way, the IoT device activity abstraction engine 510 can be characterized as replacing raw data with a pointer. Alternatively or in addition, the raw data could be replaced with a simplified descriptor or in some other applicable manner.

Figure 6:
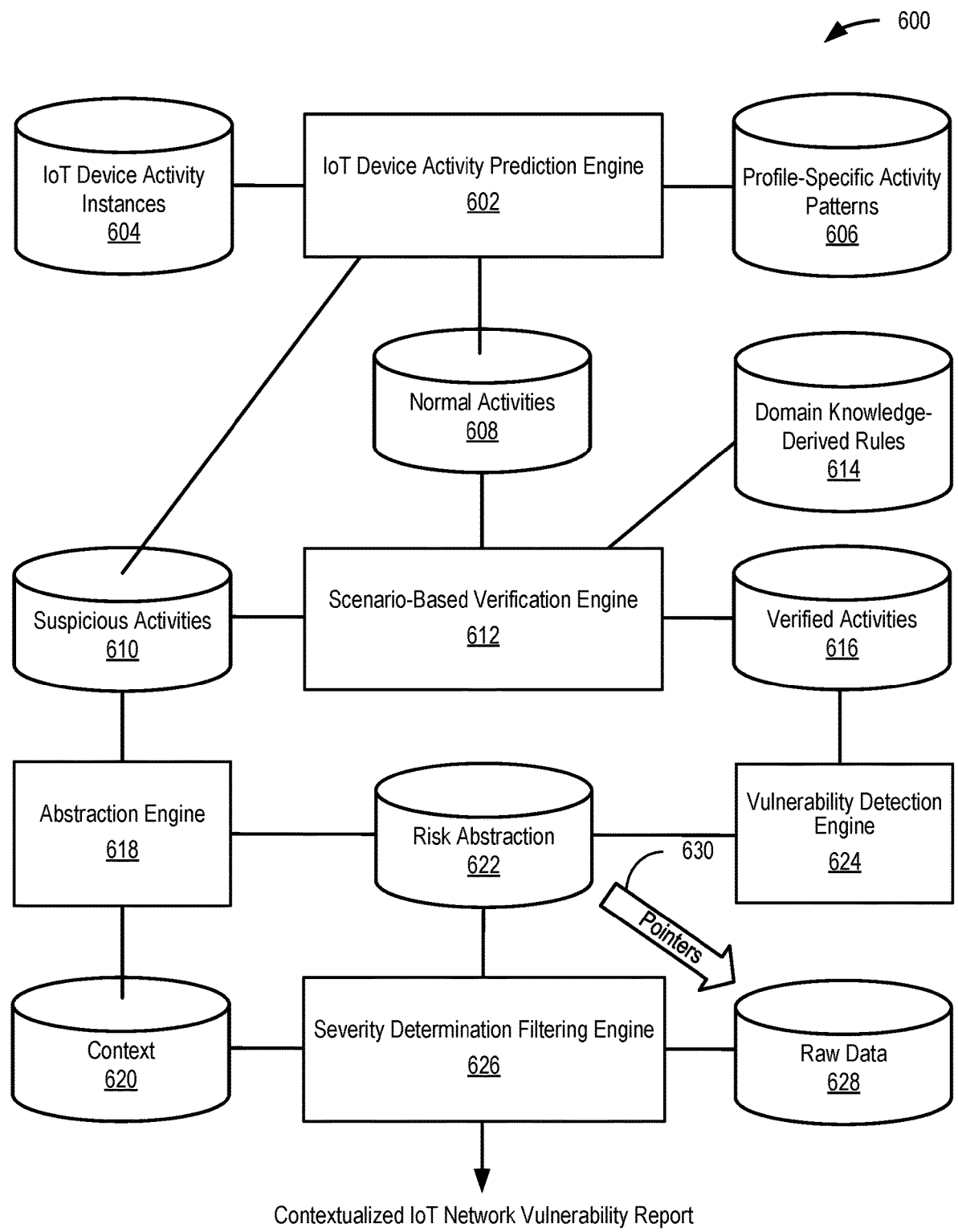
FIG. 6 depicts a diagram of an example of an IoT device activity pattern matching system.

FIG. 6 depicts a diagram 600 of an example of an IoT device activity pattern matching system. The diagram 600 includes an IoT device activity prediction engine 602, an IoT device activity instances datastore 604 coupled to the IoT device activity prediction engine 602, a profile-specific activity patterns datastore 606 coupled to the IoT device activity prediction engine 602, a normal activities datastore 608 coupled to the IoT device activity prediction engine 602, a suspicious activities datastore 610 coupled to the IoT device activity prediction engine 602, a scenario-based verification engine 612 coupled to the normal activities datastore 608 and the suspicious activities datastore 610, a domain knowledge-derived rules datastore 614, a verified activities datastore 616, an abstraction engine 618 coupled to the suspicious activities datastore 610, a context datastore 620 coupled to the abstraction engine 618, a risk abstraction datastore 622 coupled to the abstraction engine 618, a vulnerability detection engine 624 coupled to the verified activities datastore 616 and the risk abstraction datastore 622, a severity determination filtering engine 626 coupled to the context datastore 620 and the risk abstraction datastore 622, and a raw data datastore 628 coupled to the severity determination filtering engine 626.

The IoT device activity prediction engine 602 is intended to represent an engine that takes activity models built for multiple activities and attempts to match a detected activity to activity models applicable for a given IoT device profile. Advantageously, the IoT device activity prediction engine 602 can match an activity with an activity pattern not merely to detect malware, but rather (or also) to detect normal activities based upon a profile of an IoT device associated with the activity; signatures can match normal behavior. In a specific implementation, patterns are matched at the activity level, as opposed to the event level.

The IoT device activity instances datastore 604 is intended to represent a plurality of activity data structures comprising network events that have been aggregated, enriched, and/or correlated with other events to define detected activities. In a specific implementation, the activity data structures can be formed using a language that includes an activity class, defining an activity data format and procedures. In such an implementation, an activity data structure can be characterized as an instance of an activity class (i.e., an activity object) that can modify its attributes in response to transformation of events and contain a set of instances of event classes (i.e., event objects) representing events that comprise the activity.

The profile-specific activity patterns datastore 606 is intended to represent a subset of an activity patterns datastore (not shown) that is applicable to a specific profile. For illustrative purposes, it is assumed the profile-specific activity patterns datastore 606 includes patterns for a variety of different activities.

The normal activities datastore 608 is intended to represent a datastore of activity data structures that have been deemed (at least for the moment) to be benign. The IoT device activity prediction engine 602 can include a confidence threshold that is determinative (though, in a specific implementation, configurable) regarding whether an activity is put in the normal activities datastore 608. Accordingly, normal activities can have an associated confidence value. Normal activities can be used, for example, to improve machine learning models.

The suspicious activities datastore 610 is intended to represent a datastore of activity data structures that have been deemed to be potentially malicious or otherwise undesirable.

The scenario-based verification engine 612 is intended to represent an engine that considers whether activities in the normal activities datastore 608 are actually suspicious when considered in view of additional data. In an implementation in which activity data structures in the normal activities datastore 608 have a confidence value, confidence values are adjustable over time and, if a confidence value exceeds a confidence threshold, the relevant activity data structure(s) is/are moved to the suspicious activities datastore 610 instead.

The domain knowledge-derived rules datastore 614 is intended to represent a datastore that includes rules applicable to a determination as to whether an activity data structure that has previously been designated as benign should be designated as suspicious. For example, if multiple activities that are considered in isolation are benign, but when considered in the aggregate are suspicious, a first activity data structure in the normal activities datastore 608 could suffer reduced confidence when a second activity data structure is considered by the IoT device activity prediction engine 602. That is, multiple "normal" activities considered in combination can be suspicious. This is a reason why the scenario-based verification engine 612 is referred to as "scenario-based." Specifically, under a particular scenario, a benign activity can be recharacterized as a suspicious activity.

The verified activities datastore 616 is intended to represent a datastore that includes activity data structures that have been verified by the scenario-based verification engine 612. For illustrative purposes, it is assumed such data structures have an unchanging "verified" status, but it should be understood that, in practice, verified activities can have a confidence threshold that varies over time, which can result in a verified activity data structure being downgraded to suspicious (or back to normal). When the scenario-based verification engine 612 fails to verify an activity, the scenario-based verification engine 612 can store the corresponding activity data structure in the suspicious activities datastore 610, as described previously, instead of the verified activities datastore 616.

The abstraction engine 618 is intended to represent an engine that abstracts activities into behaviors, which are application-driven collections of one or more related activities. Alternatively or in addition, the abstraction can be to a personality, which is a collection of behaviors. Behavior is used to describe a specific type of IoT device. Behaviors are application-driven because the abstraction engine 618 is aware of the applications running over it (as represented by the coupling of the abstraction engine 618 to the context datastore 620 in the diagram 600, where the context includes application differentiation data), which are accommodated with appropriate policies, such as quality of service, selective access, special encapsulation mechanisms, and/or application-specific routing, to name several options. In a specific implementation, application awareness is appropriate policies are distributed through a switching and/or routing fabric of the network to get them actuated on relevant equipment ports, network legs using an applicable protocol (e.g., SDN). Alternatively or in addition, the appropriate policies are implemented by configuring network devices using network management tools or individually logging into and configuring applicable network devices. This is in contrast to policies that are unaware of what applications are treated differently. Depending upon implementation-, configuration-, and preference-specific factors, application awareness can vary from relatively course-grained, such as from using TCP or UDP port numbers (e.g., TCP port 80 for http capturing traffic in bulk with one set of policies) to using DPI on payload of packets (in which case differentiation between web applications, specific users, etc. can be accomplished). In a specific implementation, events incorporate a network session, with the relative granularity that entails, but uses DPI in some, but not all, circumstances (e.g., as an active test to better confirm confidence for activity verification purposes).

The context datastore 620 is intended to represent a datastore that includes activity (or behavior or personality) data structures that are not represented in the suspicious activities datastore 610, domain knowledge to the extent the domain knowledge was not already employed by the scenario-based verification engine 612 to identify suspicious activities for storage in the suspicious activities datastore 610, and otherwise serves as a catch-all of data that improves the abstraction of activities into a behavior (or personality) data structure for an IoT device.

The risk abstraction datastore 622 is intended to represent a datastore of behavior (or personality) data structures stored therein by the abstraction engine 618.

The vulnerability detection engine 624 is intended to represent an engine that considers verified activity data structures from the verified activities datastore 616 and behavior data structures in the risk abstraction datastore 622 to identify vulnerabilities in an IoT network. In a specific implementation, the vulnerability detection is used to improve behavior models for machine learning. Instead or in addition, the vulnerability detection engine 624 modifies the verified activities datastore 616 in response to vulnerability detection. The vulnerability detection engine 624 may or may not modify the risk abstraction datastore 622 in response to vulnerability detection (though modifying the verified activities datastore 616 can result in changes as the impact works its way through the system).

The severity determination filtering engine 626 is intended to represent an engine that generates a contextualized IoT network vulnerability report. The severity determination filtering engine 626 is coupled to the context datastore 620, which, in a specific implementation, includes reporting preferences. Reporting preferences can include default thresholds, customized thresholds, and context-derived thresholds used to filter data from reports. Default thresholds can include no threshold at all, allowing all behavior data structures to be reported, or graduated thresholds that weight certain behaviors differently than other behaviors. Customized thresholds can incorporate network administrator preferences regarding the amount of risk that should be incorporated into reports and/or the types of reports to be generated. Context-derived thresholds can include thresholds that are adjusted based upon context; for example, if there is a lot of potential risk, lower-risk reports may be filtered.

The raw data datastore 628 is intended to represent a datastore that includes data that was lost through prior abstraction processes. The pointers arrow 630 is intended to represent maintenance of a pointer to raw data that is abstracted out by the abstraction engine 618 (and perhaps by the vulnerability detection engine 624), though a similar arrow could have been illustrated for any applicable engine that performs abstraction (not shown to avoid clutter). In a specific implementation, the severity determination filtering engine 626 includes in the contextualized IoT network vulnerability report a reference to raw data filtered out during a prior abstraction process using an applicable raw data item location identifier, such as a pointer or simplified descriptor. Advantageously, in this specific implementation, a network administrator, or human or artificial agent thereof, or some other party can dig into the contextualized IoT network vulnerability report if more precision regarding an IoT device's behavior (or multiple IoT devices' behavior) is desired.

Figure 7:
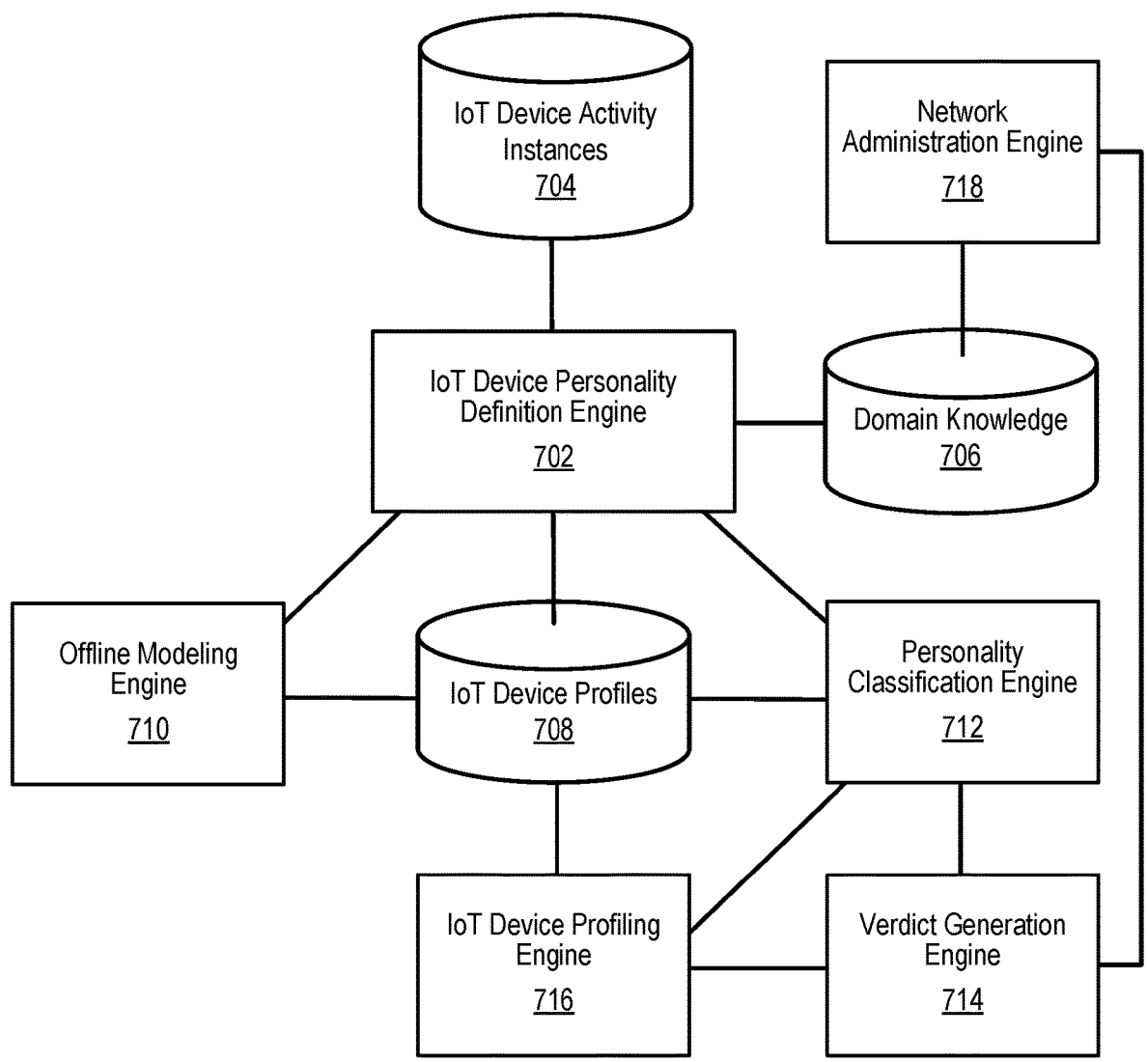
FIG. 7 depicts a diagram of an example of an IoT device profiling system.

FIG. 7 depicts a diagram 700 of an example of an IoT device profiling system. The diagram 700 includes an IoT device personality definition engine 702, an IoT device activity instances datastore 704 coupled to the IoT device personality definition engine 702, a domain knowledge datastore 706 coupled to the IoT device personality definition engine 702, an IoT device profiles datastore 708 coupled to the IoT device personality definition engine 702, an offline modeling engine 710 coupled to the IoT device personality definition engine 702 and the IoT device profiles datastore 708, a personality classification engine 712 coupled to the IoT device personality definition engine 702 and the IoT device profiles datastore 708, a verdict generation engine coupled to the personality classification engine 712, an IoT device profiling engine 716 coupled to the IoT device profiles datastore 708 and the verdict generation engine 714, and a network administration engine 718 coupled to the domain knowledge datastore 706 and the verdict generation engine 714.

The IoT device personality definition engine 702 is intended to represent an engine that defines a personality of an IoT device using activities associated with the IoT device from the IoT device activity instances datastore 704 and domain knowledge from the domain knowledge datastore 706. In a specific implementation, the IoT device personality definition engine 702 facilitates profiling of an IoT device by creating, reading, updating, and/or deleting (CRUDing) IoT device profile data structures in the IoT device profiles datastore 708. Alternatively or in addition, the IoT personality definition engine 702 can define a personality of an IoT device using aggregated, enriched, and/or transformed events (activity data structures) by defining feature values indicative of behaviors of the IoT device.

The offline modeling engine 710 is intended to represent an engine that builds a behavior detection model for use in IoT network security using feature values provided from the IoT personality definition engine 702. In a specific implementation, the offline modeling engine 710 builds a context-based undesired behavior detection model using feature values indicative of IoT device behavior. Instead or in addition, the offline modeling engine 710 can use an applicable machine learning engine to recognize behavior patterns in feature values and to build a context-based undesired behavior detection model. For example, the offline modeling engine 710 can use either or both learned state transition-based learning (including decision tree-based classification, neural network-based classification, or other applicable machine learning classification) and deep learning to identify behavior patterns of an IoT device. In a specific implementation, the offline modeling engine 710 provides models to the IoT device profiles datastore 708.

The personality classification engine 712 is intended to represent an engine that applies a behavior detection model to feature values provided from the IoT personality definition engine 702. In a specific implementation, the personality classification engine 712 applies a context-based undesired behavior detection model in the IoT device profiles datastore 708 (from the offline modeling engine 710) to feature values of the IoT device identified by the IoT personality definition engine 702. In such an implementation, the personality classification engine 712 can generate a signal comparing detected behavior (derived from the IoT device activity instances datastore 704) of an IoT device to modeled behavior of the IoT device.

The verdict generation engine 714 is intended to represent an engine that uses the signal from the personality classification engine 712 to generate a verdict.

The IoT device profiling engine 716 is intended to represent an engine that identifies a personality profile for an IoT device. The IoT device profiling engine 716 can detect whether an IoT device profile exists in the IoT device profiles datastore 708 for the IoT device based on actual behavior derived from activity data structures in the IoT device activity instances datastore 704 and feature values determined by the IoT device personality definition engine 702 (conceptually, the feature values are assumed to pass from the IoT device personality definition engine 702 to the personality classification engine 716, which may pass the feature values to the IoT device profiling engine 716 or provide some other abstraction, such as a behavior or personality). In a specific implementation, the IoT device profiling engine 716 updates the IoT device profiles datastore 708 with a personality data set, which the IoT personality definition engine 702 can use to improve its feature value generation function.

In a specific implementation, the verdict generation engine 714 generates an alert indicating how the IoT device deviated from normal behavior patterns (e.g., benign behavior patterns), which is provided to the network administration engine 716. The network administration engine 716 is intended to represent an engine that updates the domain knowledge datastore 706 in accordance with behavior alerts. In a specific implementation, the alert is an undesired behavior alert.

The techniques described in the preceding text and figures can be mixed and matched as circumstances demand to produce alternative implementations.

The invention claimed is:

1. A method of detecting undesirable behavior of an Internet-of-Things (IoT) device, the method comprising:
    associating a first subset of patterns of a superset of patterns with a first IoT device profile of a plurality of IoT device profiles;
    attributing the first IoT device profile to a first IoT device;
    detecting first IoT device events, the first IoT device events including one or more network sessions of the first IoT device;
    generating an activity data structure from the first IoT device events and from other events, including by abstracting at least one of the first IoT device events or the other events, wherein the abstracting of the at least one of the first IoT device events or the other events entails a loss of data associated with events in favor of a more useful characterization of activities associated with IoT devices, wherein the generated activity data structure comprises a labeled collection of events, and wherein at least one of the other events comprises a non-network event;
    determining an activity of the first IoT device based on the activity data structure;
    applying the first subset of patterns to the activity of the first IoT device; and
    generating an alert when an application of the first subset of patterns to the activity of the first IoT device is indicative of undesirable behavior for a device to which the first IoT device profile is attributed.

2. The method of claim 1, wherein the first IoT device profile is attributed to the first IoT device prior to deployment of the first IoT device.

3. The method of claim 1, wherein the first IoT device profile is attributed to the first IoT device after deployment of the first IoT device.

4. The method of claim 1, wherein the first IoT device profile is attributed to the first IoT device after deployment of the first IoT device, and the first IoT device profile is a default IoT device profile that is dynamically modified using available data.

5. The method of claim 1, wherein the first IoT device events are detected using passive monitoring.

6. The method of claim 1, wherein the first IoT device events are detected using packet headers in messages sent to or from the first IoT device.

7. The method of claim 1, wherein the first IoT device events are aggregated to form one or more composite first IoT device events using machine learning.

8. The method of claim 1, wherein the first IoT device events are aggregated to form one or more composite first IoT device events using a device implemented as part of a local area network (LAN) that includes the first IoT device.

9. The method of claim 1, wherein the first IoT device does not have a history of previously exhibited undesirable behavior, and the undesirable behavior includes anomalous behavior of the first IoT device.

10. The method of claim 1, wherein the first IoT device has a history of previously exhibited undesirable behavior, and the undesirable behavior includes normal behavior of the first IoT device.

11. A system comprising:
    a processor configured to:
        associate a first subset of patterns of a superset of patterns with a first IoT device profile of a plurality of IoT device profiles;

attribute the first IoT device profile to a first IoT device;

detect first IoT device events, the first IoT device events including one or more network sessions of the first IoT device;

generate an activity data structure from the first IoT device events and from other events, including by abstracting at least one of the first IoT device events or the other events, wherein the abstracting of the at least one of the first IoT device events or the other events entails a loss of data associated with events in favor of a more useful characterization of activities associated with IoT devices, wherein the generated activity data structure comprises a labeled collection of events, and wherein at least one of the other events comprises a non-network event;

determine an activity of the first IoT device based on the activity data structure;

apply the first subset of patterns to the activity of the first IoT device; and generate an alert when an application of the first subset of patterns to the activity of the first IoT device is indicative of undesirable behavior for a device to which the first IoT device profile is attributed; and a memory coupled to the processor and configured to provide the processor with instructions.

12. The system of claim 11, wherein the first IoT device profile is attributed to the first IoT device prior to deployment of the first IoT device.

13. The system of claim 11, wherein the first IoT device profile is attributed to the first IoT device after deployment of the first IoT device.

14. The system of claim 11, wherein the first IoT device profile is attributed to the first IoT device after deployment of the first IoT device, and the first IoT device profile is a default IoT device profile that is dynamically modified using available data.

15. The system of claim 11, wherein the first IoT device events are detected using passive monitoring.

16. The system of claim 11, wherein the first IoT device events are detected using packet headers in messages sent to or from the first IoT device.

17. The system of claim 11, wherein the processor is further configured to aggregate the first IoT device events to form one or more composite first IoT device events using machine learning.

18. The system of claim 11, wherein the processor is further configured to aggregate the first IoT device events to form one or more composite first IoT device events using a device implemented as part of a local area network (LAN) that includes the first IoT device.

19. The system of claim 11, wherein the first IoT device does not have a history of previously exhibited undesirable behavior, and the undesirable behavior includes anomalous behavior of the first IoT device.

20. The system of claim 11, wherein the first IoT device has a history of previously exhibited undesirable behavior, and the undesirable behavior includes normal behavior of the first IoT device.

21. The method of claim 1, wherein a plurality of discrete events are aggregated to form one or more composite events using machine learning.

22. The method of claim 21, wherein the one or more composite events are formed using common factor aggregation.

23. The method of claim 22, wherein a common factor used in the common factor aggregation includes a device profile common to a plurality of devices.

24. The method of claim 22, wherein a common factor used in the common factor aggregation includes an operating system vendor common to a plurality of devices.

25. The method of claim 22, wherein a common factor used in the common factor aggregation includes an operating system version common to a plurality of devices.

26. The method of claim 22, wherein a common factor used in the common factor aggregation includes use of an application common to a plurality of devices.

27. The method of claim 22, wherein a common factor used in the common factor aggregation includes communication via a particular subnetwork common to a plurality of devices.

28. The method of claim 1, wherein the abstracting includes enriching at least one event.

29. The method of claim 28, wherein the enriching includes associating data with an event.

30. The method of claim 29, wherein the data associated with the event comprises another event.

31. The system of claim 11, wherein a plurality of discrete events are aggregated to form one or more composite events using machine learning.

32. The system of claim 31, wherein the one or more composite events are formed using common factor aggregation.

33. The system of claim 32, wherein a common factor used in the common factor aggregation includes a device profile common to a plurality of devices.

34. The system of claim 32, wherein a common factor used in the common factor aggregation includes an operating system vendor common to a plurality of devices.

35. The system of claim 32, wherein a common factor used in the common factor aggregation includes an operating system version common to a plurality of devices.

36. The system of claim 32, wherein a common factor used in the common factor aggregation includes use of an application common to a plurality of devices.

37. The system of claim 32, wherein a common factor used in the common factor aggregation includes communication via a particular subnetwork common to a plurality of devices.

38. The system of claim 11, wherein the abstracting includes enriching at least one event includes associating data with an event.

39. The system of claim 38, wherein the enriching includes associating data with an event associated with the event comprises another event.

40. The system of claim 38, wherein the data associated with the event comprises another event.

* * * * *